United States Patent
Yang

[11] Patent Number: 6,036,221
[45] Date of Patent: *Mar. 14, 2000

[54] FOLDABLE ROD LINKAGE OF A FOLDABLE STROLLER

[76] Inventor: Chih-Huang Yang, 7-1Fl., No. 9-7, Sec. 2, Chung-Kang Rd., Taichung City, Taiwan

[*] Notice: This patent is subject to a terminal disclaimer.

[21] Appl. No.: 09/334,376

[22] Filed: Jun. 16, 1999

Related U.S. Application Data

[63] Continuation-in-part of application No. 08/908,649, Aug. 7, 1997, Pat. No. 5,934,153.

[51] Int. Cl.[7] .................................................. B62B 7/06
[52] U.S. Cl. .............................. 280/642; 74/485; 74/488; 74/489; 74/502.2; 280/650; 403/102; 403/325
[58] Field of Search .............................. 74/488, 489, 485, 74/502.2; 280/642, 650; 403/102, 325

[56] References Cited

U.S. PATENT DOCUMENTS

| | | | |
|---|---|---|---|
| 1,902,524 | 3/1933 | Roth | 74/488 |
| 2,874,587 | 2/1959 | Schmid | 74/488 |
| 4,848,787 | 7/1989 | Kassai | 280/642 |
| 5,110,150 | 5/1992 | Chen | 280/642 |
| 5,460,398 | 10/1995 | Huang | 280/642 |
| 5,478,102 | 12/1995 | Huang | 280/642 |
| 5,605,409 | 2/1997 | Haut et al. | 280/642 X |
| 5,645,293 | 7/1997 | Cheng | 280/642 |
| 5,775,718 | 7/1998 | Huang | 280/642 |
| 5,934,153 | 8/1999 | Yang | 74/551.3 |

*Primary Examiner*—Michael Mar
*Attorney, Agent, or Firm*—Fish & Richardson P.C.

[57] ABSTRACT

A foldable rod linkage for connecting a handgrip to a front wheel of a foldable stroller includes a lower mount member having front lateral walls extending rearwardly from two ends of an upright front wall, an upward abutment wall between the left and right front lateral walls, an upright bore for receiving an upper end of a front rod, and rear lateral walls extending respectively from the front lateral walls. An upper slide body has a through-hole to permit extension of a handle rod such that a lower end of the latter is pivoted on the rear lateral walls, and a downward abutment wall to mate with the upward abutment wall when the linkage is in an unfolded position. An operating device is mounted movably on the handgrip, and includes a pull rod having a lower end mounted on the slide body such that upward pulling of the pull rod will result in disengagement of the slide body from the lower mount member.

2 Claims, 11 Drawing Sheets

FOLDABLE ROD LINKAGE OF A FOLDABLE STROLLER

CROSS-REFERENCE TO RELATED APPLICATION

This application is a Continuation-in-Part of U.S. patent application Ser. No. 08/908,649, which was filed by the applicant on Aug. 7, 1997, now U.S. Pat. No. 5,934,153.

FIELD OF THE INVENTION

The invention relates to a stroller, more particularly to a foldable rod linkage for connecting a handgrip of the stroller to a front wheel of the same.

DESCRIPTION OF THE RELATED ART

Referring to FIGS. 1 and 2, a foldable stroller is shown to include a handgrip 2a and a front wheel 1a which are interconnected by means of a conventional foldable rod linkage 3. As illustrated, the conventional foldable rod linkage 3 comprises a pivot retainer including a lower mount member 4 and an upper slide body 5, a handle rod 2, a front rod 1, and means for biasing the upper slide body 5 to move downward so as to abut against the lower mount member 4. The lower mount member 4 has a first upright front wall 401, left and right front lateral walls 402 which extend respectively and rearwardly from two upright lateral ends of the first upright front wall 401, and an upward abutment wall 403 which is disposed transversely between the left and right front lateral walls 402 and which converges upwardly with an upper end of the first upright front wall 401 to form an upwardly extending apex portion 403a. The lower mount member 4 further has an upright bore 404 which extends in a first axial direction, and left and right rear lateral walls 405 which extend respectively from the left and right front lateral walls 402 and which are disposed rearwardly and below the upward abutment wall 403.

The upper slide body 5 has a lower abutment portion 501 supported on the upward abutment wall 403 of the lower mount member 4 when the conventional foldable rod linkage is in an unfolded position, an upright through hole 5a which extends parallel to the first axial direction, and a downwardly opening blind bore 5d aligned with the upright bore 404 in the lower mount member 4.

The handle rod 2 has a lower end 20b extending through the upright through hole 5a of the upper slide body 5 so as to be mounted pivotally on the left and right rear lateral walls 405 at a pivot 4b, and an upper end 20a adapted to be connected to the handgrip 2a.

The front rod 1 is secured in the through bore 404 of the lower mount member 4 by the use of a rivet 4a, and has an upper end 10b and a lower end 10a adapted to be connected to the front wheel 1a.

The biasing means, such as a compression spring, biases the upper slide body 5 to move downward relative to the handle rod 2 so as to permit extension of the upper end 10b of the front rod 1 into the blind bore 5d of the upper slide body 5 and so as to abut the lower abutment portion 501 against the upward abutment wall 403 when the conventional foldable rod linkage 3 is in the unfolded position.

When desired, the upper slide body 5 can be lifted upward against biasing action of the biasing means to disengage the upper end 10b of the front rod 1 from the blind bore 5d and the lower abutment portion 501 from the upward abutment wall 403 such that the upper slide body 5 together with the handle rod 2 can be turned relative to the front rod 1 about the pivot 4b, thereby converting the conventional rod linkage 3 into a folded position.

In use, the pushing action of the user on the handgrip 2a creates a downwardly oriented force on the slide body 5 such that the latter may be turned relative to the lower mount member 4. As a result, disengagement of the slide body 5 from the lower mount member 4 is still possible.

In co-pending U.S. patent application Ser. No. 08/908, 649, the applicant disclosed a foldable rod linkage for connecting a handgrip to a front wheel of a foldable stroller. The foldable rod linkage includes a lower mount member, an upper slide body, a handle rod, and a front rod. The lower mount member has left and right front lateral walls extending rearwardly from two lateral ends of an upright front wall, and an upward abutment wall between the left and right front lateral walls, an upright rear wall which extends downward from a distal side of the upward abutment wall to define an upright bore in a first axial direction for receiving an upper end of the front rod. The lower mount member further has left and right rear lateral walls which extend respectively from the left and right front lateral walls and which are disposed below the upright rear wall to form seat portions. The slide body includes an elongated member provided with a second upright front wall, and a lower abutment portion supported on the seat portions. The elongated member has a through-hole in a second axial direction to permit extension of the handle rod such that a lower end of the latter is pivoted on the rear lateral walls. A forward anchoring portion extends forwardly from the second upright front wall, and includes a downward abutment wall to mate with the upward abutment wall when the linkage is in an unfolded position.

SUMMARY OF THE INVENTION

The main object of this invention is to provide a foldable rod linkage for interconnecting a handgrip and a front wheel of a stroller and which is adapted to be folded with the use of a single hand and without the need to bend.

Accordingly, a foldable rod linkage is used for connecting a handgrip to a front wheel of a foldable stroller, and includes a pivot retainer consisting of a lower mount member and an upper slide body, a handle rod, a front rod, biasing means, and an operating device. The lower mount member has an upright front wall, left and right front lateral walls extending respectively and rearwardly from two upright lateral ends of the upright front wall, an upward abutment wall disposed transversely between the left and right front lateral walls and converging upwardly with an upper end of the upright front wall to form an upwardly extending apex portion, an upright bore that extends in a first axial direction and that opens at the upward abutment wall, and left and right rear lateral walls extending respectively from the left and right front lateral walls. The upper slide body has an upright through hole extending in a second axial direction which is parallel to the first axial direction, a downward abutment wall to mate with the upward abutment wall when the foldable rod linkage is in the unfolded position, and a stud member extending downwardly from the downward abutment wall and coinciding with and being received in the upright bore when the foldable rod linkage is in the unfolded position.

The handle rod has an upper end adapted to be connected to the handgrip and a lower end inserted into and extending downwardly and outwardly of the upright through hole and mounted pivotally on the left and right rear lateral walls about an axis, transverse to the first axial direction.

The front rod has a lower end adapted to be connected to the front wheel and an upper end connected to the lower mount member.

The biasing means biases the slide body downward relative to the handle rod toward the lower mount member so as to insert the stud member into the upright bore and subsequently abut the downward abutment wall against the upward abutment wall when the foldable rod linkage is in the unfolded position.

The operating device includes an operating sleeve adapted to be mounted rotatably on the handgrip and provided with a radial outward mounting block, and a pull rod having a lower end mounted pivotally on the slide body and an upper end connected to said mounting block on said operating sleeve such that rotation of the operating sleeve on the handgrip can result in upward pulling of the pull rod and in upward movement of the slide body relative to the handle rod against biasing action of the biasing means, thereby moving the stud member from the upright bore and disengaging the downward abutment wall from the upward abutment wall and subsequently permitting the handle rod together with the slide body to turn relative to the front rod at the axis so as to convert the foldable rod linkage into a folded position.

BRIEF DESCRIPTION OF THE DRAWINGS

Other features and advantages of this invention will become more apparent in the following detailed description of the preferred embodiment of this invention, with reference to the accompanying drawings, in which.

DETAILED DESCRIPTION OF THE PREFERRED EMBODIMENT

Figure 1:
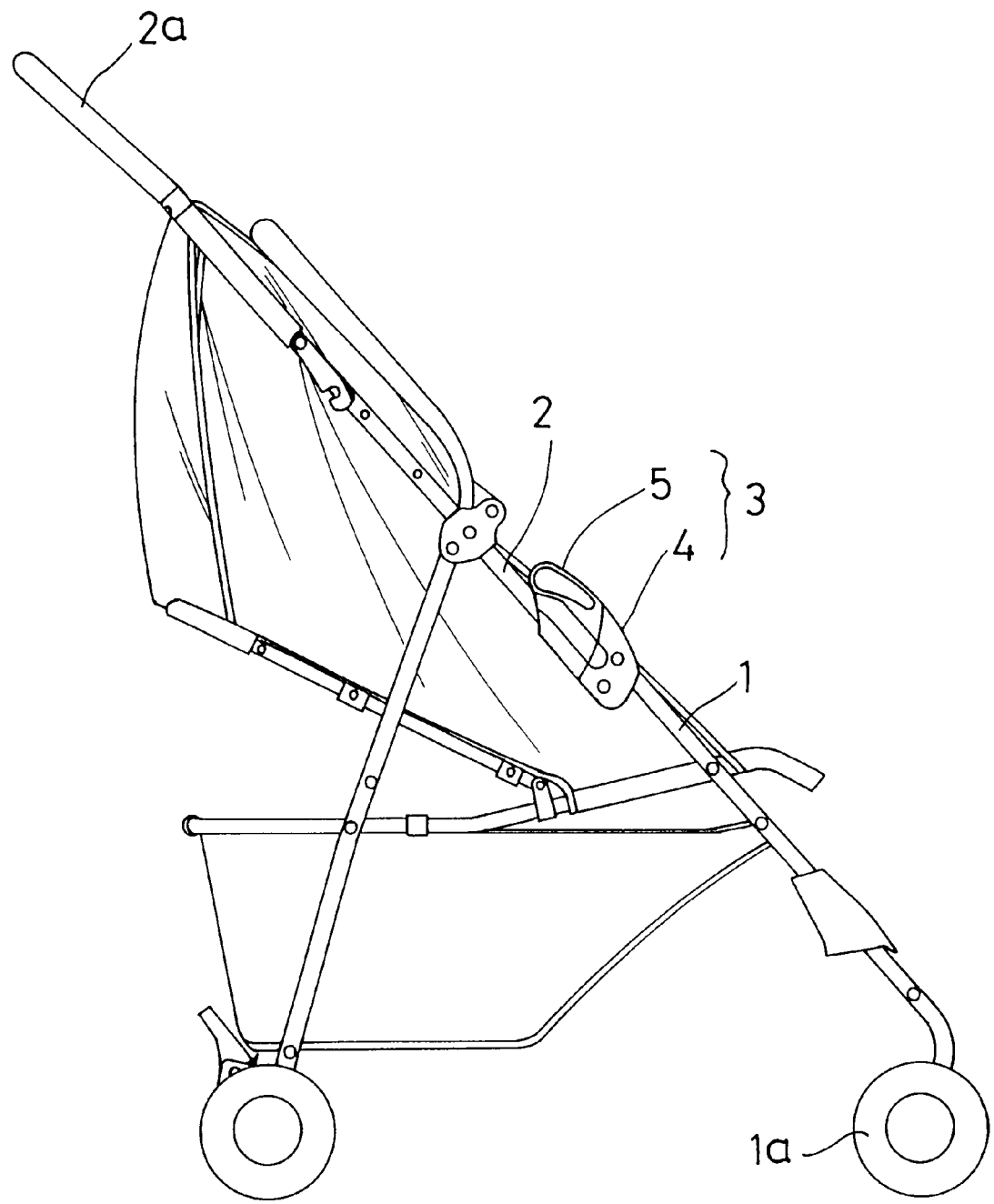
FIG. 1 illustrates a foldable stroller which has a handgrip and a front rod that are interconnected by means of a conventional foldable rod linkage.
Figure 2:
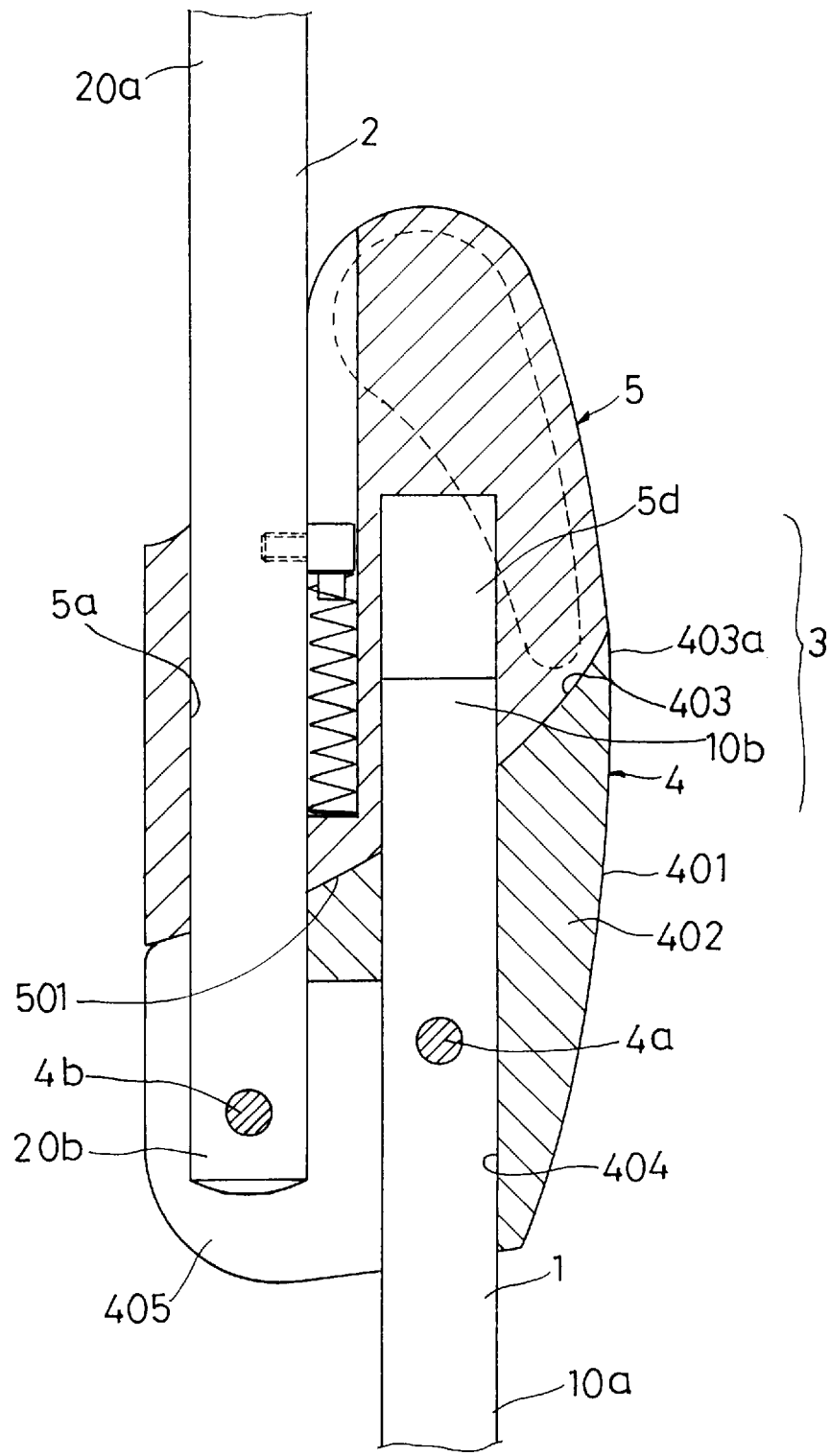
FIG. 2 is a partly sectional view of the conventional foldable rod linkage.
Figure 3:
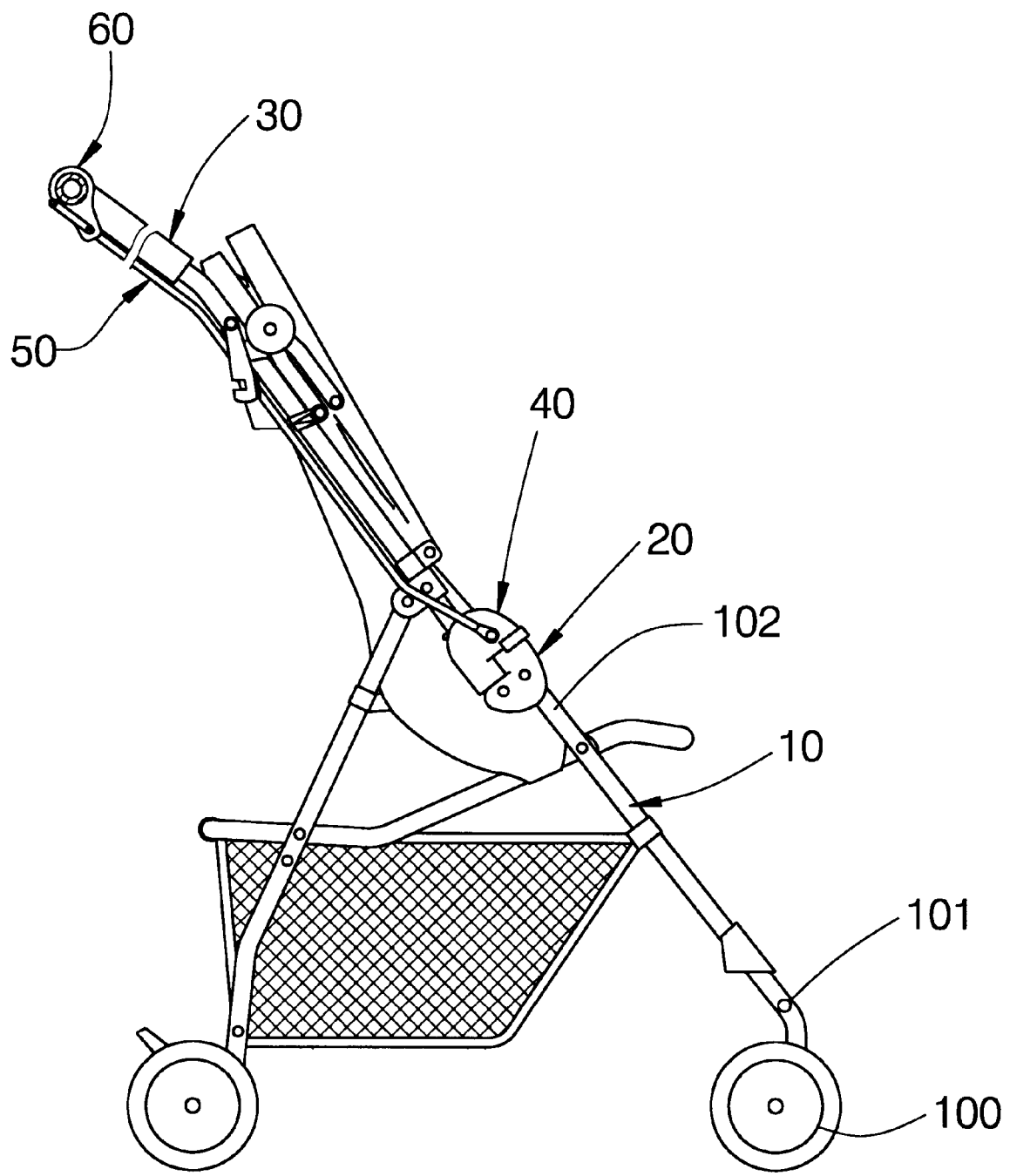
FIG. 3 illustrates a foldable stroller which has a handgrip and a front rod that are interconnected by the preferred embodiment of a foldable rod linkage of the present invention.
Figure 4:
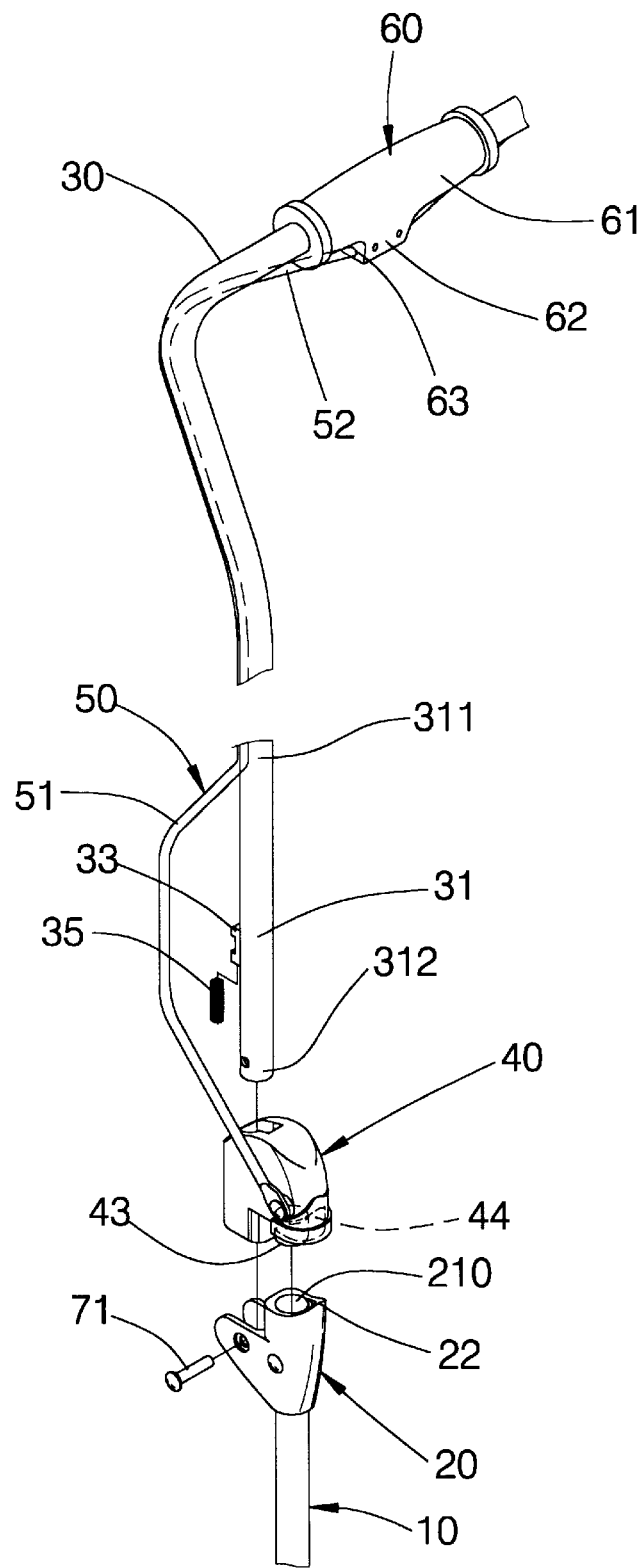
FIG. 4 is a partly exploded view of the preferred embodiment.

Referring to FIGS. 3, 4, 5 and 6, the preferred embodiment of a foldable rod linkage according to the present invention is shown to be used for connecting a handgrip 30 to a front wheel 100 of a foldable stroller, and includes two pivot retainers respectively consisting of a lower mount member 20 and an upper slide body 40, a pair of handle rods 31, a pair of front rods 10, two biasing means, and an operating device 60. Only one of the pivot retainers, the handle rods 31 and the front rods 10 will be described in the succeeding paragraphs to simplify understanding of the present invention.

As illustrated, the lower mount member 20 has a first upright front wall 201, left and right front lateral walls 202 extending respectively and rearwardly from two upright lateral ends of the first upright front wall 201, an upward abutment wall 203 disposed transversely between the left and right front lateral walls 202 and converging upwardly with an upper end of the first upright front wall 201 to form an upwardly extending apex portion 22, and an upright rear wall 204 extending downwardly from a distal side of the upward abutment wall 203 relative to the apex portion 22 so as to define an inserted portion. The inserted portion has an upright bore 210 that extends in a first axial direction and that opens at the upward abutment wall 203. Left and right rear lateral walls 205 extend respectively from the left and right front lateral walls 202, and are disposed rearwardly and below the upright rear wall 204 so as to form left and right upward seat portions 206.

The upper slide body 40 includes an upright elongated member 41 provided with a second upright front wall 401, and a lower abutment portion 402 supported on the left and right upward seat portions 206 of the lower mount member 20 when the foldable rod linkage is in an unfolded position. The upright elongated member 41 has an upright through hole 405 extending in a second axial direction which is parallel to the first axial direction and opening towards a space defined between the left and right upward seat portions 206. A forward anchoring portion 403 extends forwardly from the second upright front wall 401, and includes a downward abutment wall 404 to mate with the upward abutment wall 203 when the foldable rod linkage is in the unfolded position. The downward abutment wall 404 is disposed above and is in a stepwise position relative to the lower abutment portion 402 so as to define an upright forward facing section 44 on the second upright front wall 401. A tab portion 45 extends from a distal edge of the downward abutment wall 404 relative to the second upright front wall 401 such that the tab portion 45 and the upright forward facing section 44 flank the apex portion 22 and the upright rear wall 204 respectively when the foldable rod linkage is in the unfolded position. A stud member 43 extends downwardly from the downward abutment wall 404 and coincides with and is received in the upright bore 210 when the foldable rod linkage is in the unfolded position.

Figure 5:
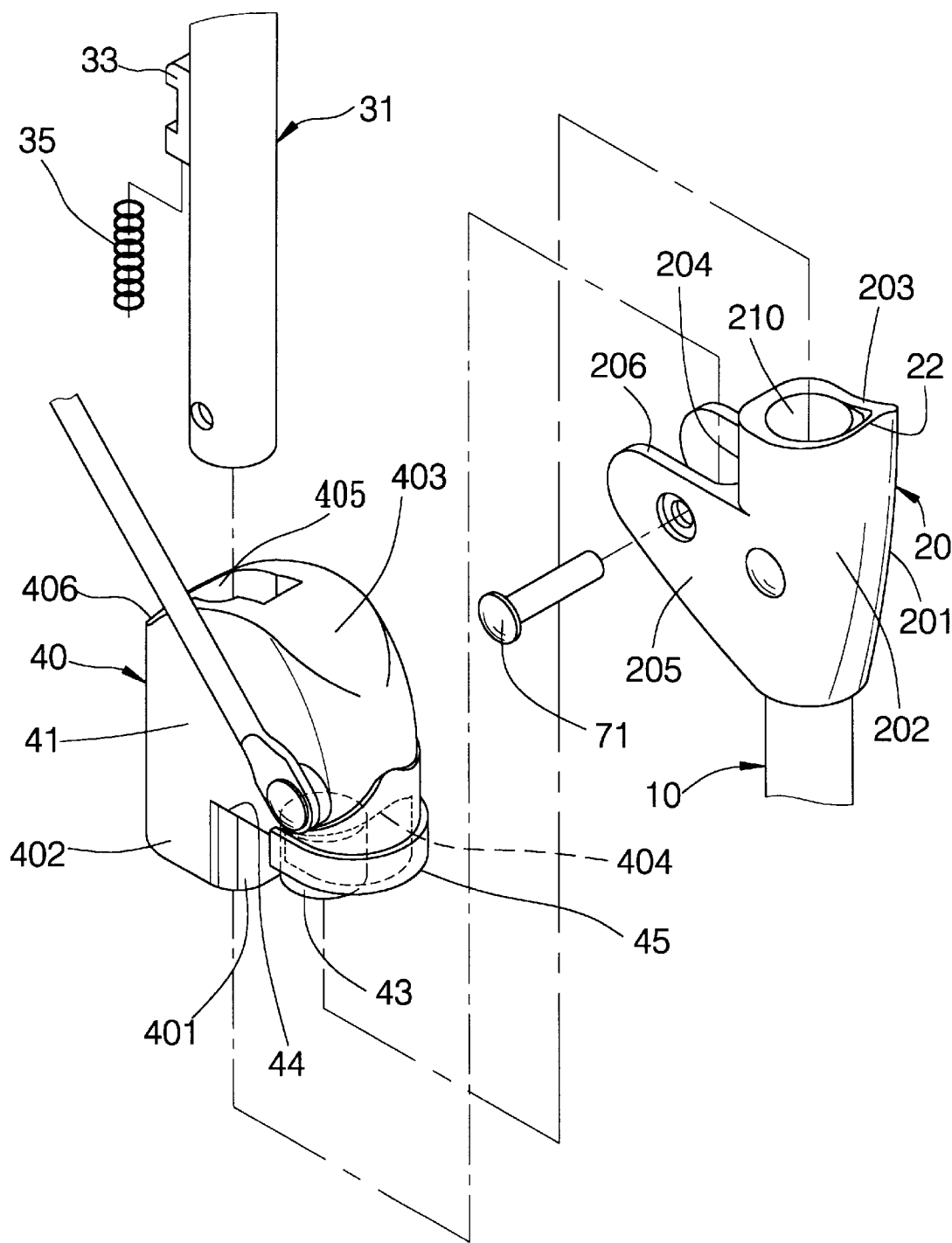
FIG. 5 is an enlarged, partly exploded view of the preferred embodiment, wherein an operating device thereof is removed for the sake of clarity.
Figure 6:
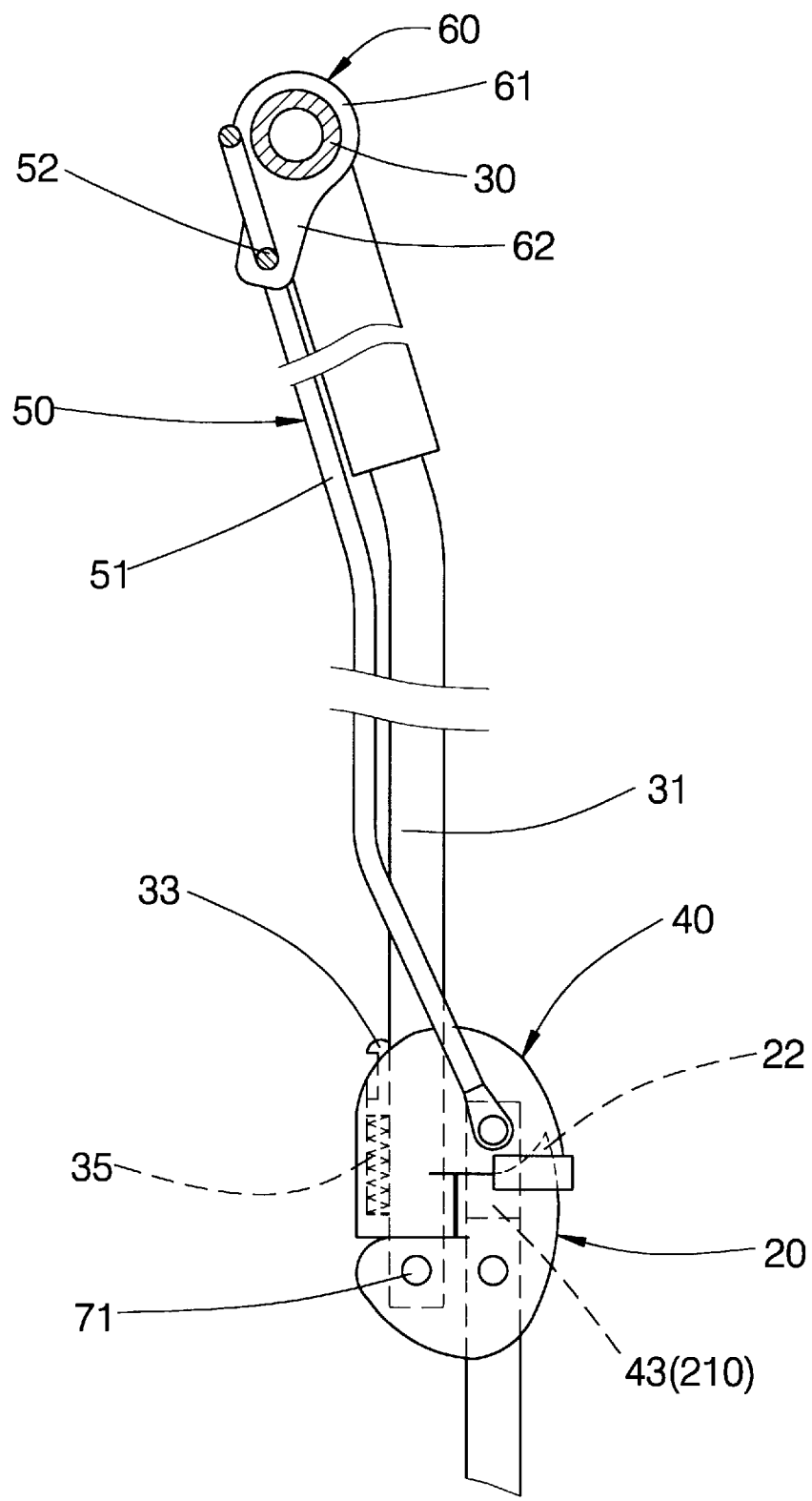
FIG. 6 is a side view of the preferred embodiment in an unfolded position.

The handle rod 31 has an upper end 311 (see FIG. 4) connected integrally to the handgrip 30 and a lower end 312 inserted into and extending downwardly and outwardly of the upright through hole 405 and mounted pivotally on the left and right rear lateral walls 205 by means of a rivet 71 below the left and right upward seat portions 206 (see FIG. 5). The rivet 71 extends through the left and right rear lateral walls 205 in a direction transverse to the first axial direction.

The front rod 10 has a lower end 101 (see FIG. 3) connected to the front wheel 100 and an upper end 102 (see FIG. 3) connected to the lower mount member 20.

Figure 7:
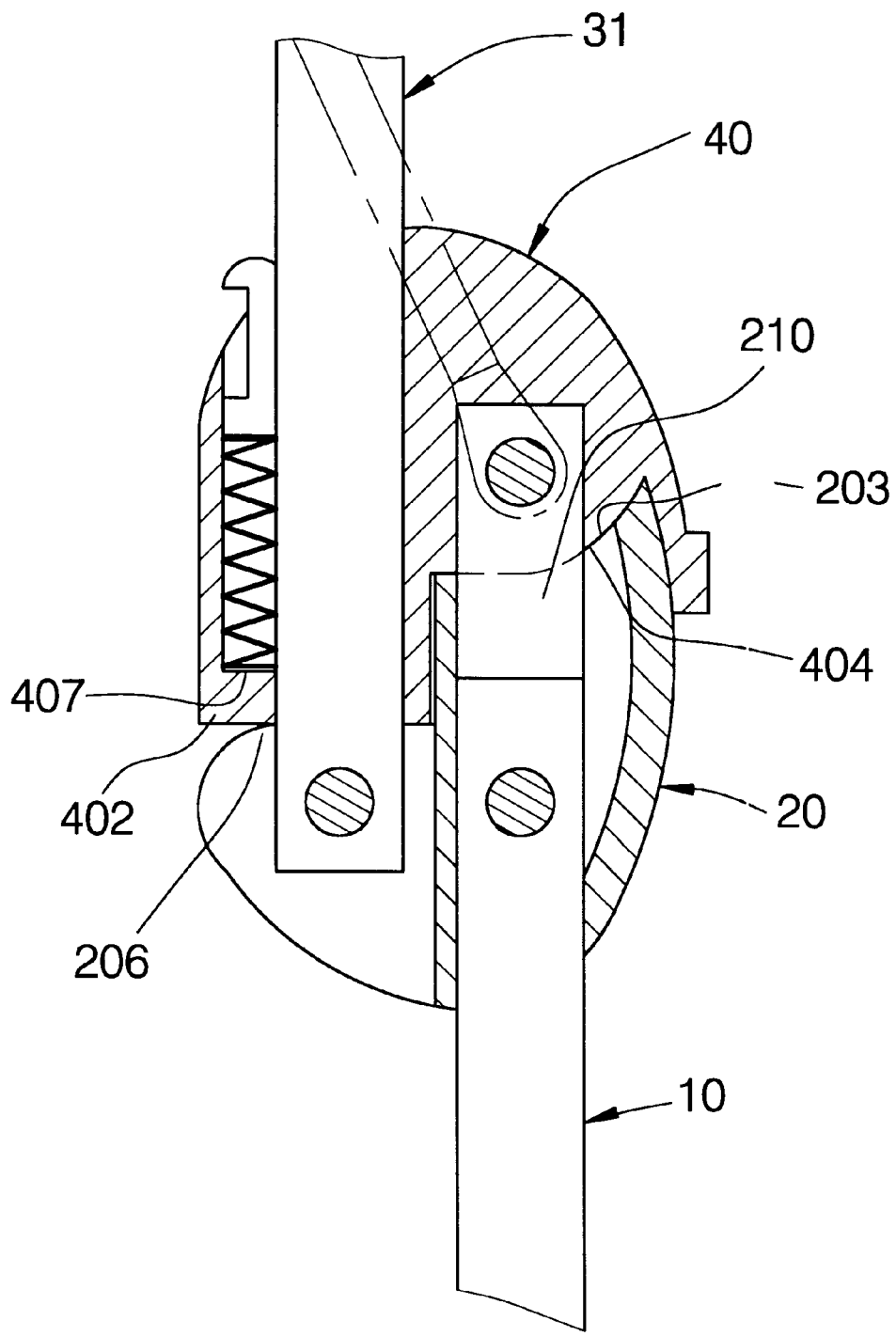
FIG. 7 is an enlarged side view of the preferred embodiment in the unfolded position, wherein the operating device is removed for the sake of clarity.

The elongated member 41 of the slide body 40 further has a spring retention bore 406 extending parallel to the first axial direction and in communication with the through hole 405. The spring retention bore 406 has a spring-abutment bottom 407 (see FIG. 7) transverse to the first axial direction. The biasing means includes a spring-mounting block 33 fixed on the handle rod 31 proximate to the lower end 312 thereof, and a compression spring 35 which has an upper end mounted on the mounting block 33 and a lower end disposed at the spring-abutment bottom 407 to bias the slide body 40 downward relative to the handle rod 31 and toward the lower mount member 20, thereby inserting the stud member 43 into the upright bore 210 and subsequently abutting the downward abutment wall 404 and the lower abutment portion 402 against the upward abutment wall 203 and the left and right upward seat portions 206 of the lower mount member 20 respectively when the foldable rod linkage is in the unfolded position (see FIG. 7).

Figure 8:
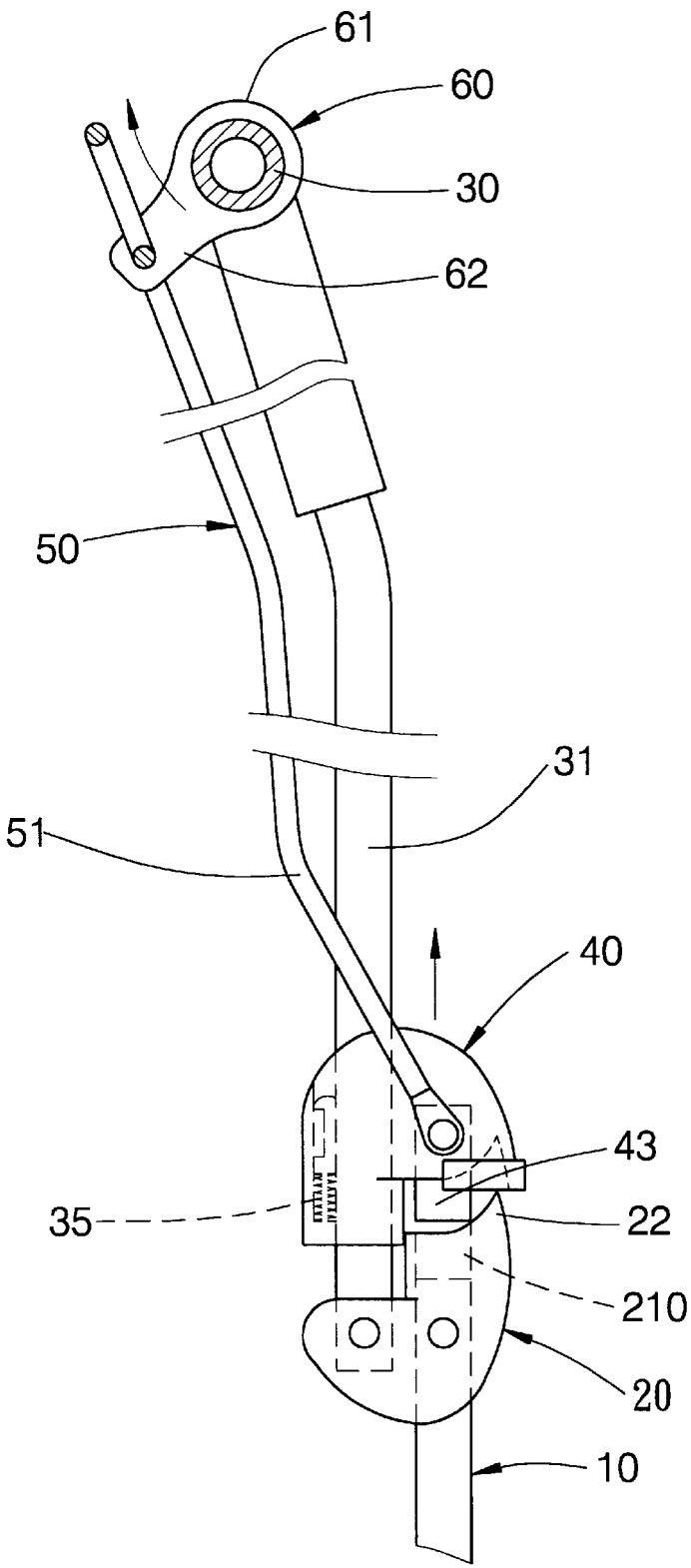
FIG. 8 is a side view illustrating the preferred embodiment upon actuation of the operating device utilized therein.
Figure 9:
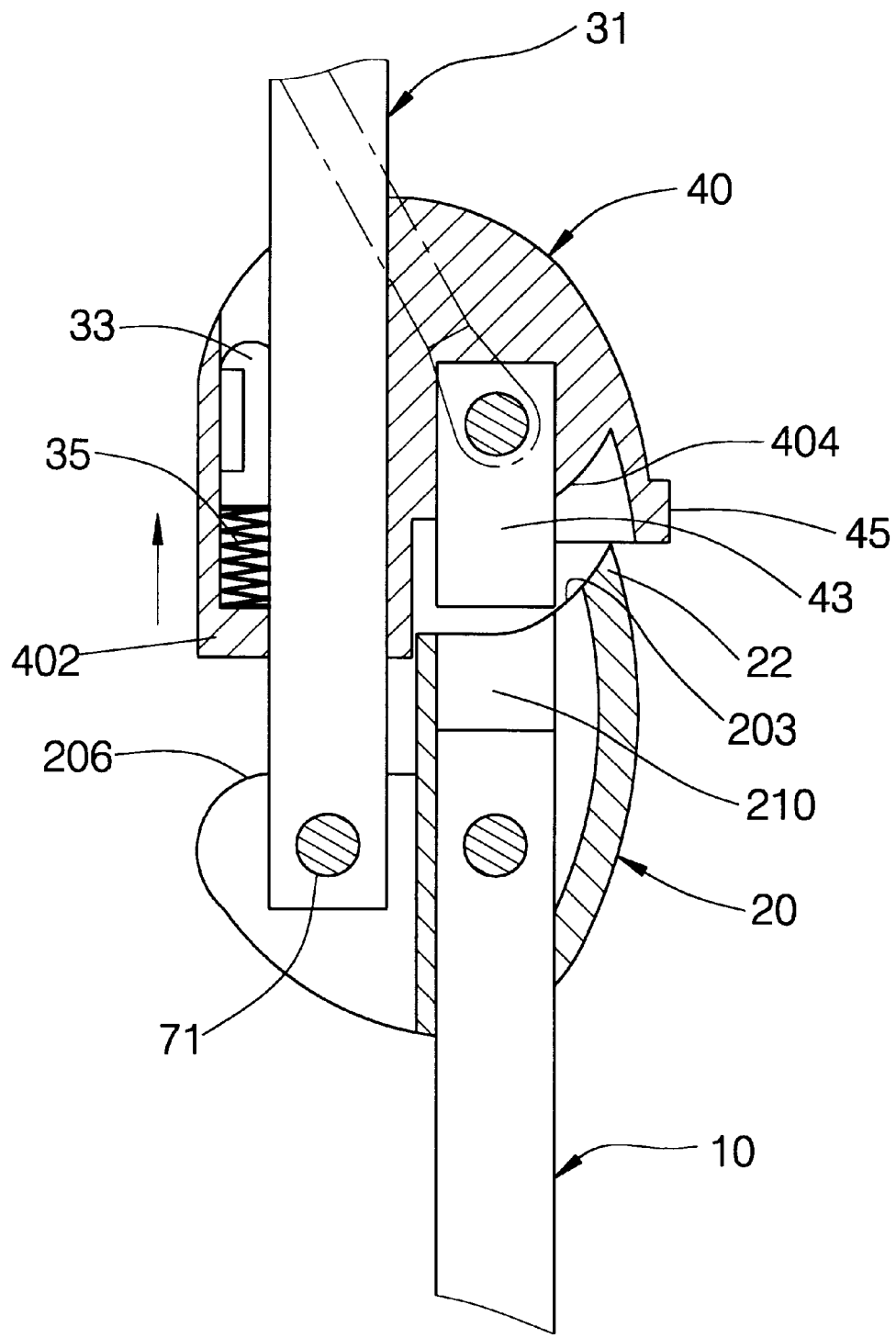
FIG. 9 is an enlarged side view of the preferred embodiment shown in FIG. 8, wherein the operating device is removed for the sake of clarity.
Figure 10:
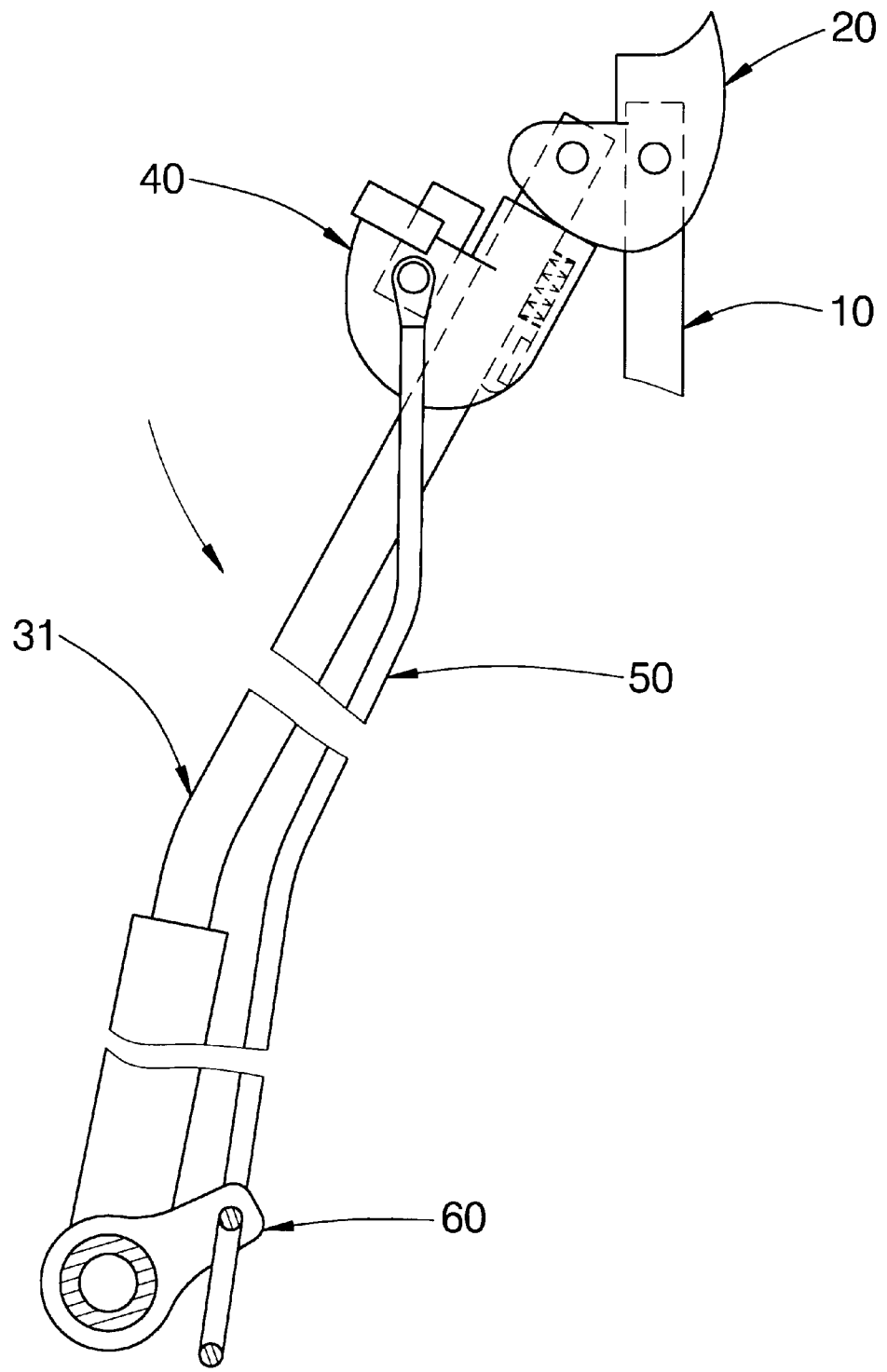
FIG. 10 is a side view of the preferred embodiment in a folded position.
Figure 11:
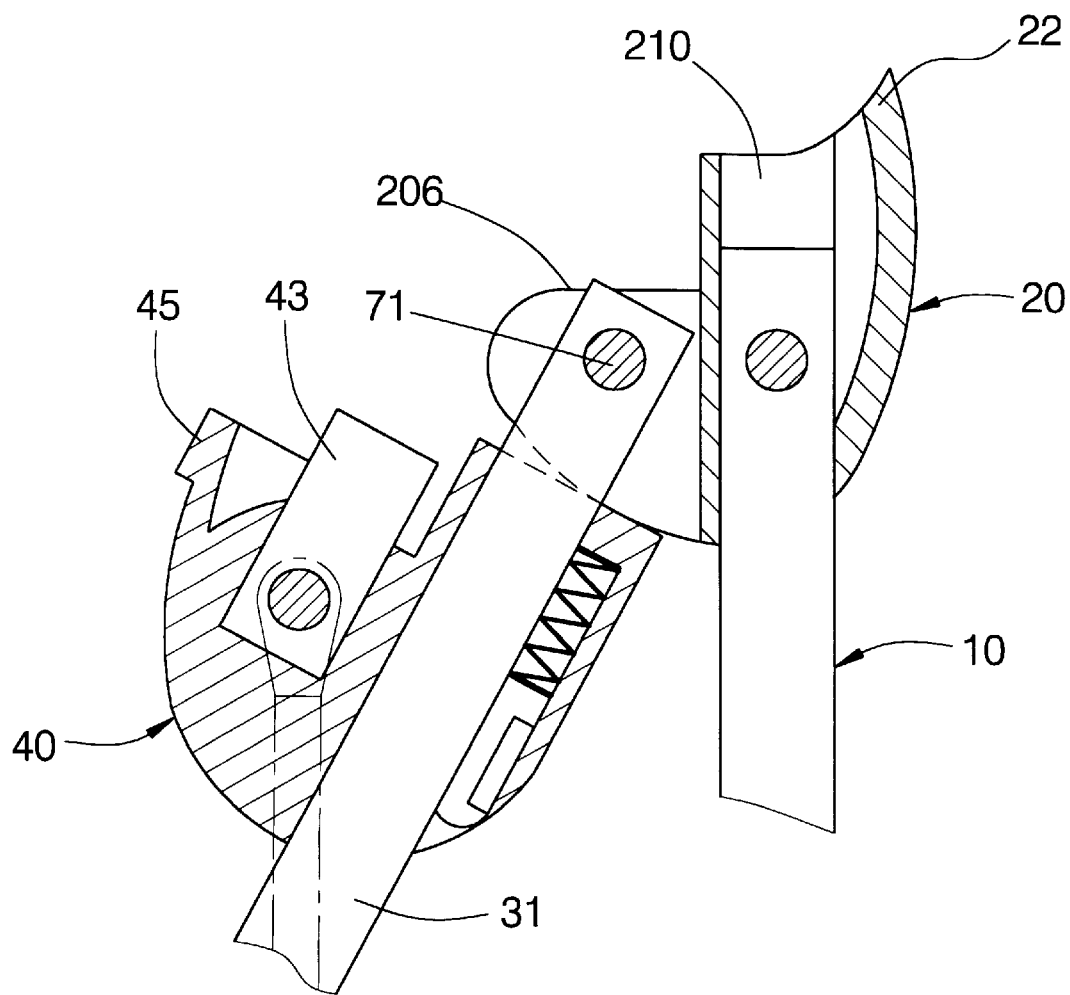
FIG. 11 is an enlarged side view of the preferred embodiment shown in FIG. 10, wherein the operating device is removed for the sake of clarity.

The operating device includes a U-shaped pull rod 50 having lower ends 51 mounted on the slide bodies 40 and an upper end 52 connected movably to the handgrip 30 in such a manner that upward pulling of the pull rod 50, as illustrated in FIG. 8, will result in upward movement of the slide bodies 40 relative to the handle rods 31 against biasing action of the springs 35, as shown in FIG. 9. Under this condition, the stud members 43 are removed from the upright bores 210 to disengage the downward abutment walls 404 and the lower abutment portions 402 from the upward abutment walls 203 and the left and right upward seat portions 206 and to subsequently permit the handle rods 31 together with the slide bodies 40 to turn relative to the front rods 10 about the rivets 71 so as to convert the foldable rod linkage into a folded position, as best shown in FIGS. 10 and 11.

In the preferred embodiment, the operating device 60 further includes an operating sleeve 61 mounted rotatably on the handgrip 30 and provided with a radial outward mounting block 62. The lower ends 51 of the pull rod 50 are mounted pivotally on the slide bodies 40. The upper end 52 of the pull rod 50 is connected to the mounting block 62 on the operating sleeve 61 such that rotation of the sleeve member 61 on the handgrip 30 can result in upward pulling of the pull rod 50.

Note that only a single hand is needed to operate the foldable rod linkage of the present invention. Thus, in case one hand of the user is occupied, the rod linkage can be operated with the use of the other hand, thereby resulting in great convenience to the user.

With this invention thus explained, it is apparent that numerous modifications and variations can be made without departing from the scope and spirit of this invention. It is therefore intended that this invention be limited only as indicated in the appended claims.

I claim:

1. A foldable rod linkage for connecting a handgrip to a front wheel of a foldable stroller, comprising:

a pivot retainer including a lower mount member and an upper slide body;

said lower mount member having a first upright front wall, left and right front lateral walls extending respectively and rearwardly from two upright lateral ends of said first upright front wall, an upward abutment wall disposed transversely between said left and right front lateral walls and converging upwardly with an upper end of said first upright front wall to form an upwardly extending apex portion, an upright rear wall extending downwardly from a distal side of said upward abutment wall relative to said apex portion so as to define an inserted portion which has an upright bore extending in a first axial direction and opening at said upward abutment wall, and left and right rear lateral walls extending respectively from said left and right front lateral walls and disposed rearwardly and below said upright rear wall so as to form left and right upward seat portions;

said upper slide body including an upright elongated member provided with a second upright front wall, and a lower abutment portion supported on said left and right upward seat portions when the foldable rod linkage is in an unfolded position, said upright elongated member having an upright through hole extending in a second axial direction which is parallel to said first axial direction and opening towards a space defined between said left and right upward seat portions, a forward anchoring portion extending forwardly from said second upright front wall, and including a downward abutment wall to mate with said upward abutment wall when the foldable rod linkage is in the unfolded position, said downward abutment wall being disposed above and in a stepwise position relative to said lower abutment portion so as to define an upright forward facing section on said second upright front wall, a tab portion extending from a distal edge of said downward abutment wall relative to said second upright front wall, wherein said tab portion and said upright forward facing section flank said apex portion and said upright rear wall respectively when the foldable rod linkage is in the unfolded position, and a stud member extending downwardly from said downward abutment wall and coinciding with and being received in said upright bore when the foldable rod linkage is in the unfolded position;

a handle rod having an upper end adapted to be connected to the handgrip and a lower end inserted into and extending downwardly and outwardly of said upright through hole and mounted pivotally on said left and right rear lateral walls about an axis below said left and right upward seat portions and transverse to said first axial direction;

a front rod having a lower end adapted to be connected to the front wheel and an upper end connected to said lower mount member;

means for biasing said slide body downward relative to said handle rod toward said lower mount member so as to insert said stud member into said upright bore and subsequently abutting said downward abutment wall and said lower abutment portion against said upward abutment wall and said left and right upward seat portions of said lower mount member respectively when the foldable rod linkage is in the unfolded position; and an operating device including a pull rod having a lower end mounted on said slide body and an upper end adapted to be connected movably to the handgrip in such a manner that upward pulling of said pull rod will result in upward movement of said slide body relative to said handle rod against biasing action of said biasing means, thereby removing said stud member from said upright bore and disengaging said downward abutment wall and said lower abutment portion from said upward abutment wall and said left and right upward seat portions and subsequently permitting said handle rod together with said slide body to turn relative to said front rod at said axis so as to convert the foldable rod linkage into a folded position.

2. The foldable rod linkage as defined in claim 1, wherein said operating device further includes an operating sleeve adapted to be mounted rotatably on the handgrip and provided with a radial outward mounting block, said lower end of said pull rod being mounted pivotally on said slide body, said upper end of said pull rod being connected to said mounting block on said operating sleeve such that rotation of said operating sleeve on the handgrip can result in upward pulling of said pull rod.

* * * * *